INVENTOR
NORMAN R. HASTINGS
BY A. Yates Dowell
ATTORNEY

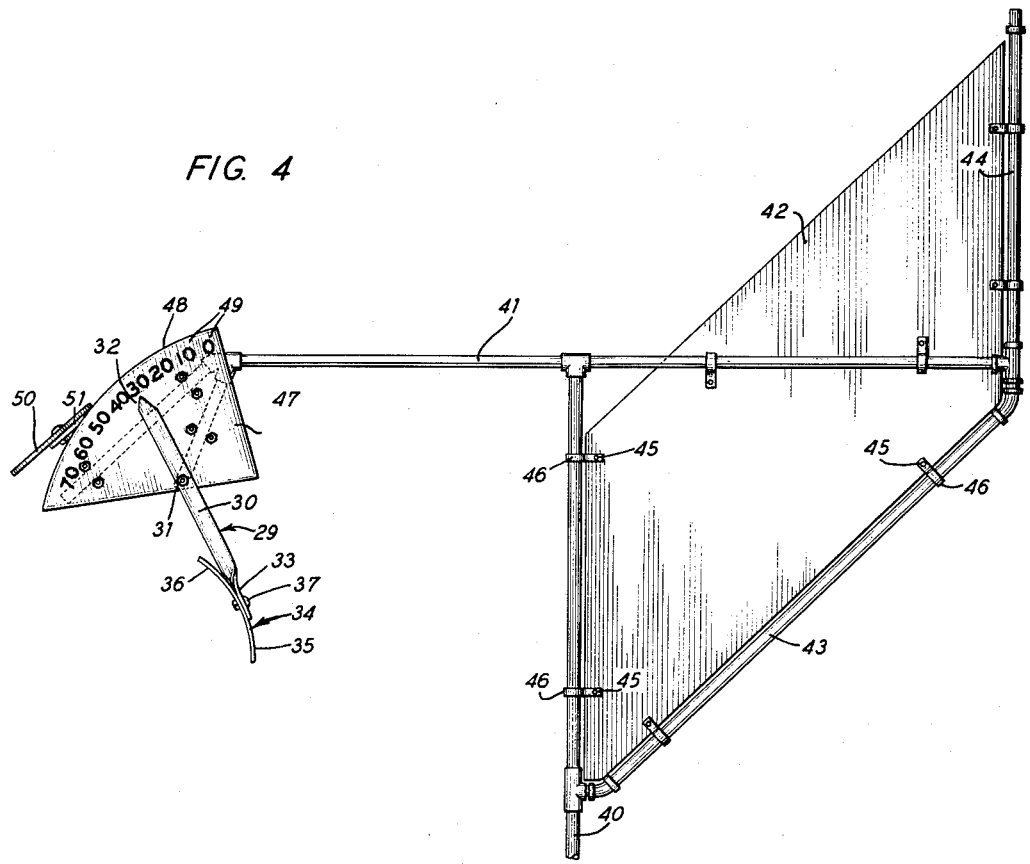

United States Patent Office 2,749,751
Patented June 12, 1956

2,749,751

ANEMOMETER WIND VANE

Norman R. Hastings, Huron, S. Dak., assignor to Walk Time, Inc., Huron, S. Dak., a corporation of South Dakota Application March 9, 1953, Serial No. 341,254

8 Claims. (Cl. 73—189)

This invention relates to the measurements of the velocity of the wind and the indication of its direction. Wind velocity and direction indicators have been used heretofore but the present invention combines the two functions in a manner to produce improved operation, and particularly improved stability of the device when subjected to relatively high wind velocities.

Accordingly, it is an object of the present invention to provide a combined wind velocity and direction indicator which is designed for maximum stability.

A further object is the provision of an indicator of this type which is simple in construction, easy to use, and designed so that the reaction of the wind velocity indicator tending to unstabilize the device is overcome by reaction against another portion of the device.

A further object is the provision of an indicator of this type whose basic velocity indicating component may be employed at various positions on a wind direction indicator to suit the requirements of the user.

Figure 1:
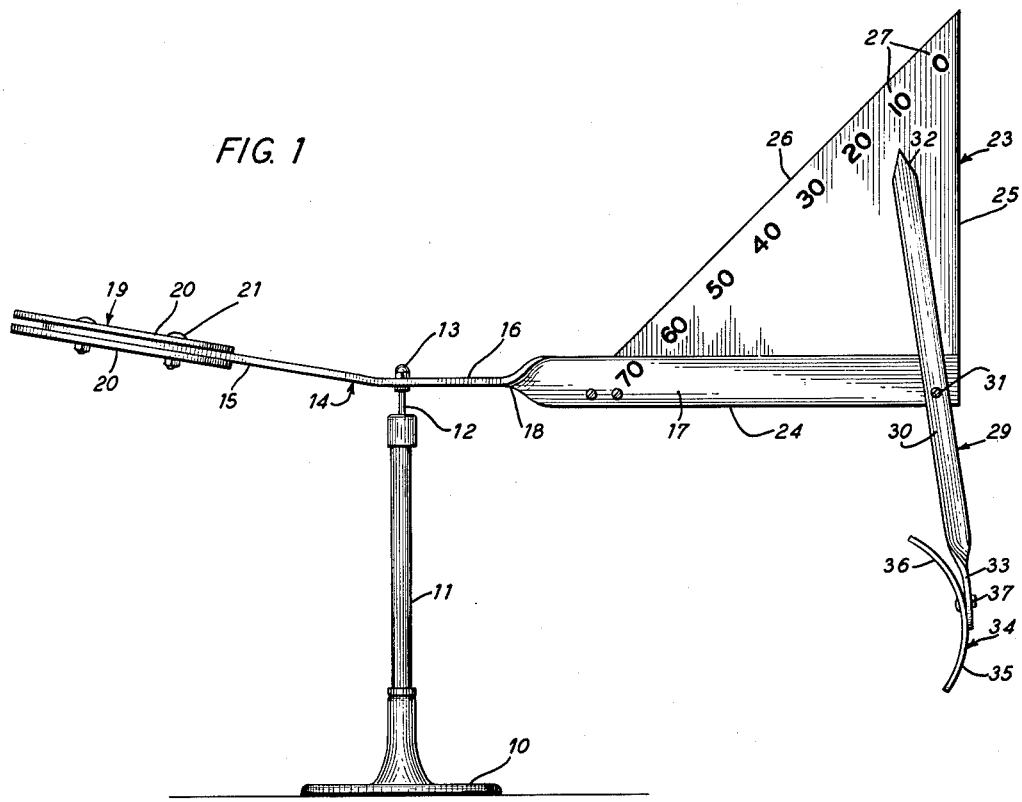
Figure 2:
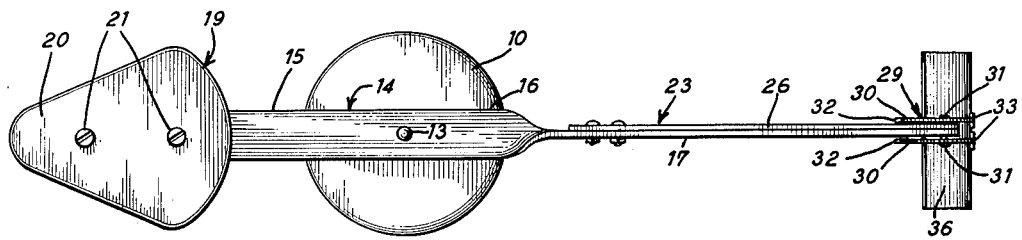
Figure 3:
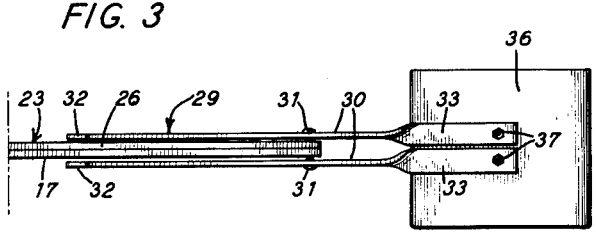

These and other objects of the invention will become apparent from the following description in conjunction with the accompanying drawings in which:

Fig. 1 is a side elevation of a combination wind velocity and direction indicator constructed in accordance with the present invention;

Fig. 2, a top plan view of the structure of Fig. 1;

Fig. 3, a rear elevation of the wind velocity indicating arm;

Fig. 4, a side elevation of a modification; and Fig. 5, a top plan view of the structure of Fig. 4.

Briefly stated, the illustrated embodiments include a vertical support on which a substantially horizontal arm having a fin is rotatably mounted. In the preferred embodiment the forward portion of the rotatable arm is inclined upwardly and carries a broad flat point or head. The rear portion of the arm carries an elongated member having an arcuate cup or scoop at its lower end of substantial weight, the member being pivotally mounted for movement about a horizontal axis normal to the direction of the wind. As the scoop is moved rearwardly by the wind, the upper portion above the pivot to which the member is attached indicates the velocity on a scale on the fin. The torque produced by the reaction of the wind against the scoop tending to raise the portion of the arm carrying the fin is offset by the torque produced by the wind's impact against the underside of the inclined head at the other end of the arm. Thus, the tendency of the arm to tilt is overcome.

In the modified form, a substantially larger fin is employed in order to provide a large surface area for advertising purposes or the like. A smaller fin is attached to the front portion of the arm next to the point or head and has the velocity indicator attached to it as in the first modification. In order to counteract the tendency of the wind to raise the front end of the arm, the point or head is inclined downwardly in this modification.

Referring to the drawings, the device includes a base 10 which may be suitably mounted on a fixed support exposed to the wind. Shaft 11 extends vertically upwardly from the base and has a rod 12 extending upwardly from its upper extremity.

Rotatably mounted on the rod by a fastener 13 is an arm or vane 14. The arm has a forward portion 15 which is inclined slightly upwardly from the horizontal and a substantially horizontal rearward portion 16. The arm is mounted on the rod 12 at the foremost extremity of the rearward portion 16.

Although various materials may be employed in the construction of the arm, it is preferred to use substantially flat bar or sheet stock. The portions 15 and 16 may be formed with the flat portions of the bar facing in a vertical plane, and the rearward portion 17 twisted 90° so that the flat portions thereof face in a substantially horizontal plane.

Connected to the forward extremity of the arm 14 is a direction indicator 19 shaped similiarly to an arrowhead. The indicator is comprised of upper and lower spaced sheet members 20 conected together and to the arm by fastening means 21 passing therethrough. As the direction indicator is attached to the forward portion of the arm in the manner indicated, it will be apparent that the indicator is inclined upwardly.

The portion 17 of the arm has a fin 23 attached to it and extending upwardly. The fin is of substantially right triangular configuration and is connected to the arm so that its horizontal side 24 extends along the arm and its other side 25 extends upwardly from the rearmost portion thereof perpendicularly thereto. The diagonal side 26 of the fin has spaced velocity indicia 27 adjacent thereto.

Attached to the rear extremity of the arm is a wind velocity indicator 29. The indicator comprises a pair of spaced elongated members 30, preferably of flat bar stock and mounted for pivotal movement about a horizontal axis normal to the direction of the wind by bearing 31 extending through the arm and attached to members 30 on either side thereof. The upper ends of the members are provided with points 32 for registration with the velocity indicia on the fin. The lower ends 33 of the members 30 are twisted at right angles and attached to a wind scoop or cup 34. The scoop 34 has a lower portion 35 of substantially arcuate configuration and an upper portion 36 of a slightly sharper degree of curvature. The scoop is attached to the member by fastening means 37 at substantially its midpoint so that its concave side faces in the direction of the wind when at rest.

In operation, when the device is exposed to the wind the fin 23 orients the arm so that the direction indicator 19 points toward the source. The scoop 34 is raised by the wind, the member 29 pivoting about the bearing 31 proportionately to the wind's speed. The tendency of the scoop reacting against the bearing 31 to raise the rearward portion of the arm is substantially counteracted by the force of the wind against the underside of the indicator 19 tending to raise the forward end of the arm. As a result, undesirable tilting of the arm is eliminated and the problem of reducing binding of the arm on the support rod 12 simplified.

In the modified form of Figs. 4 and 5, a vertical standard 40 is provided which is rotatably mounted on suitable bearings and a base (not shown). Cros arm 41 is rigidly attached to the standard and mounts a fin 42 of extended area on which advertising or the like may be placed. The fin is supported by diagonal strut 43 extending from the rear extremity of the arm to the standard and by a post 44 extending vertically upwardly from the rear extremity of the arm. The fin is comprised of sheet material in the shape of a parallelogram and it attached by fastening means 45 to brackets 46 at spaced intervals on the standard, diagonal, and post.

At the forward end of the arm 41 a pair of spaced substantially triangular sheet members 47 are attached to the arm on either side thereof. The sheet members are attached in substantially the plane of the fin and have a slightly curved side 48 adjacent to which velocity indicia 49 are placed. A velocity indicator 29 like that shown in Figs. 1, 2, and 3 is attached by suitable bearing means 31 to the sheet member 47. A flat direction indicator 50 is attached by bracket 51 to the sheet member 47 and in a downwardly inclined position.

In the operation of the modified form, the fin 42 orients the device. The velocity indicator 29 reacts to the wind to indicate its speed. The tendency of the velocity indicator to raise the forward end of the arm 41 is offset by the reaction of the wind against the downwardly inclined direction indicator 50.

It will be understood that a relationship exists between the area, shape and weight of the scoop 34, the length of the member 29 to which it is attached, and the spacing of velocity indicia. One example of such relationship is as follows: The scoop 34 was made of sheet lead ⅛″ in thickness and having a density of 4 lbs. per sq. ft. thereof. The scoop surface area was 7½ square inches, resulting in the scoop weighing approximately 3 ounces. The scoop was curved to form substantially an arc of a circle 5½″ in diameter, the cord length being approximately 2⅞″. In order to design the scoop so that it gives a proportional reading when exposed to varying wind velocities, the upper portion thereof has been formed with a slightly sharper degree of curvature. This is necessary because when the member holding the scoop is at approximately 45°, if the scoop extends in a true arc, it tends to move disproportionately. With the upper portion being curved inwardly more sharply, however, the movement may be proportioned to the wind velocity. The member 29 in the example referred to is comprised of ⅜″ wide No. 20 gage galvanized tin of 7″ length, the portion of the arm extending above the bearing 31 being 3½″, and the total weight of the scoop and its support members being 3½ ounces.

Although I have disclosed particular embodiments of the invention it will be understood that the invention is not thus limited but that various modifications and substitutions are within the scope thereof, and that the invention is therefore only limited as defined in the following claims.

What is claimed is:

1. An anemometer wind vane comprising a support, an arm rotatably mounted on the support, the arm having a substantially horizontal rearward portion and an upwardly inclined forward portion, the arm being formed of sheet material, the forward portion and a portion of the rearward portion having the flat of the sheet facing in a vertical plane, the remainder facing in a horizontal plane, a head at the front extremity of the arm, said head being substantially flat and having a reduced portion at its tip and lying substantially in the plane of the forward portion of the arm, a fin extending upwardly from the rearward portion of the arm facing in a horizontal plane and substantially in the plane thereof, the fin being of substantially right triangular configuration and having one side along the arm, another side extending vertically upwardly from the rearmost extremity thereof, the sides being substantially equal, and a wind velocity indicator connected to the arm near the rear extremity of its rearward portion, said indicator comprising a pair of spaced elongated flat sheet members, one on either side of the arm and pivotally connected thereto, the corresponding end of each member having pointing means, and a weighted wind deflector connected to the other ends of the sheet members, the deflector comprising a substantially rectangular sheet member curved about an axis which extends horizontally when the deflector is mounted on the flat sheet members, and when at rest with its concave side facing in the direction of the head, the fin carrying velocity indicia in a position where the pointing means of the indicator may register therewith.

2. An anemometer wind vane comprising a support, an arm rotatably mounted on the support, the arm having a substantially horizontal rearward portion and an upwardly inclined forward portion, a head at the front extremity of the arm, said head being substantially flat and have a reduced portion at its tip and lying substantially in the plane of the forward portion of the arm, a fin extending upwardly from the rearward portion of the arm, the fin being of substantially triangular configuration and having one side along the arm, another side extending vertically upwardly from the rearmost extremity thereof, and a wind velocity indicator connected to the arm near the rear extremity of its rearward portion, said indicator comprising a pair of spaced elongated flat sheet members, one on either side of the arm and pivotally connected thereto, the corresponding end of each member having pointing means, and a weighted wind deflector connected to the other ends of the sheet members, the deflector comprising a substantially rectangular sheet member curved about an axis which extends horizontally when the deflector is mounted on the flat sheet members, and when at rest with its concave side facing in the direction of the head, the fin carrying velocity indicia in a position where the pointing means of the indicator may register therewith.

3. An anemometer wind vane comprising a support, an arm rotatably mounted on the support, the arm having a substantially horizontal rearward portion and an upwardly inclined forward portion, a head at the front extremity of the arm, said head being substantially flat and lying substantially in the plane of the forward portion of the arm, a fin extending vertically from the rearward portion of the arm, and a wind velocity indicator connected to the arm near the rear extremity of its rearward portion, said indicator comprising an elongated member pivotally connected to the arm, an end of the member having pointing means, and a weighted wind deflector connected to the other end of the member, the deflector comprising a substantially rectangular sheet member curved about an axis which extends horizontally when the deflector is mounted on the elongated member, and when at rest with its concave side facing in the direction of the head, the fin carrying velocity indicia in a position where the pointing means of the indicator may register therewith.

4. An anemometer wind vane comprising a vertical support, an arm rotatably mounted on the support, the arm having a substantially horizontal rearward portion and an upwardly inclined forward portion, a head at the front extremity of the arm, said head having a flat upwardly inclined portion, a fin extending vertically from the rearward portion of the arm, and a wind velocity indicator connected to the arm near the rear extremity of its rearward portion, said indicator comprising an elongated member pivotally mounted adjacent to the fin for swinging movement in a substantially vertical plane, an end of the member having pointing means, and a wind deflector connected to the other end of the sheet member, the deflector comprising a substantially rectangular sheet member curved about an axis which extends horizontally when the deflector is mounted on the elongated members, and when at rest with its concave side facing in the direction of the head, the fin carrying velocity indicia in a position where the pointing means of the indicator may register therewith.

5. An anemometer wind vane comprising an elongated arm mounted intermediate its ends for rotation in a substantially horizontal plane, a fin mounted at one portion of the arm and a direction indicator at the other, the fin extending in a generally vertical plane, the indicator having a substantially flat body lying in a plane substantially perpendicular to that of the fin, a velocity indicator comprising an elongated member pivotally mounted on the arm for movement substantially in the plane thereof, scoop means on the velocity indicator, indicia means mounted adjacent to the elongated member, the direction indicator being inclined from the horizontal in a direction to counteract the tendency of the velocity indicator to raise the end of the arm to which it is attached.

6. An anemometer wind vane comprising a vertically extending support, an arm mounted on said support for horizontal rotation and having portions extending on both sides of said support, panel means providing a fin extending vertically from the arm on one side of said support only, a wind velocity indicator swingably mounted on one of said portions of said arm and spaced from said support, said indicator having a wind deflector mounted thereon extending substantially transversely of said fin for receiving the impact of wind currents, whereby deflection of the deflector indicates the wind velocity and the reaction thereto tends to tilt the arm with respect to the support, and means on the arm providing a substantially counteracting tilting force to that produced by the reaction of the wind against the deflector.

7. The invention as defined in claim 6, the means providing a substantially counteracting tilting force comprising a panel member attached to the arm at a distance from the support and inclined to the horizontal and extending transversely to the fin.

8. An anemometer for measuring the velocity of the wind comprising an arm mounted for rotation about a vertical axis, a fin mounted on said arm and of sufficient size to assure that the arm points in the direction of the wind with the fin extending rearwardly from the vertical axis, a wind scoop having an indicating hand secured thereto, means pivotally suspending said scoop from said arm and normally maintained in its operative position solely by the force of gravity acting upon said scoop and suspending means, scale means on said arm closely adjacent the suspending means for said scoop whereby the indicating hand for said scoop indicates the wind velocity.

References Cited in the file of this patent

UNITED STATES PATENTS

| | | |
|---|---|---|
| 170,720 | Elliott | Dec. 7, 1875 |
| 764,759 | Owen | July 12, 1904 |
| 1,708,036 | Stenbol | Apr. 9, 1929 |
| 2,040,305 | Graham | May 12, 1936 |
| 2,491,176 | Hammond | Dec. 13, 1949 |